United States Patent [19]

Kobayashi et al.

[11] Patent Number: 4,859,871
[45] Date of Patent: Aug. 22, 1989

[54] VOLTAGE LEVEL SETTING CIRCUIT

[75] Inventors: Osamu Kobayashi, Yokohama; Kunihiko Gotch, Tokyo, both of Japan

[73] Assignee: Fujitsu Limited, Kawasaki, Japan

[21] Appl. No.: 153,894

[22] Filed: Feb. 9, 1988

[30] Foreign Application Priority Data

Feb. 13, 1987 [JP] Japan .................................. 62-31783
Feb. 20, 1987 [JP] Japan .................................. 62-37613

[51] Int. Cl.⁴ .......................... H03K 5/01; H04N 9/72; H04N 5/16
[52] U.S. Cl. ..................................... 307/264; 307/359; 307/555; 358/34; 358/171
[58] Field of Search ............... 307/359, 264, 491, 494, 307/546, 555; 358/34, 319, 171, 172, 178

[56] References Cited

U.S. PATENT DOCUMENTS

| 3,207,998 | 9/1965 | Corney et al. |
| 4,293,874 | 10/1981 | Reneau |
| 4,371,896 | 2/1983 | Shanley, II et al. |
| 4,644,198 | 2/1987 | Ahmed ............................. 307/264 |
| 4,651,213 | 3/1987 | Takimoto |
| 4,700,085 | 10/1987 | Miwada ............................ 307/359 |

FOREIGN PATENT DOCUMENTS

| 0205923 | 12/1986 | European Pat. Off. |
| 0210761 | 12/1983 | Japan .................................. 358/171 |
| 0010880 | 1/1985 | Japan .................................. 358/34 |
| 2105547 | 3/1983 | United Kingdom ................ 358/171 |

Primary Examiner—John Zazworsky
Attorney, Agent, or Firm—Armstrong, Nikaido, Marmelstein, Kubovcik & Murray

[57] ABSTRACT

A voltage level setting circuit sets a voltage level of a predetermined portion of an input signal received through a coupling capacitor to a desired reference voltage level suited for a signal processing which is carried out in a signal processing circuit, where the voltage level of the predetermined portion is used as a reference level of the input signal. The voltage level setting circuit comprises a charge injecting circuit for injecting a quantity of charge to a node between the coupling capacitor and the signal processing circuit, and a control circuit for controlling the injection of charge by the charge injection circuit responsive to a signal from the signal processing circuit so that the voltage level of the predetermined portion at the node is set to the desired reference voltage level.

19 Claims, 8 Drawing Sheets

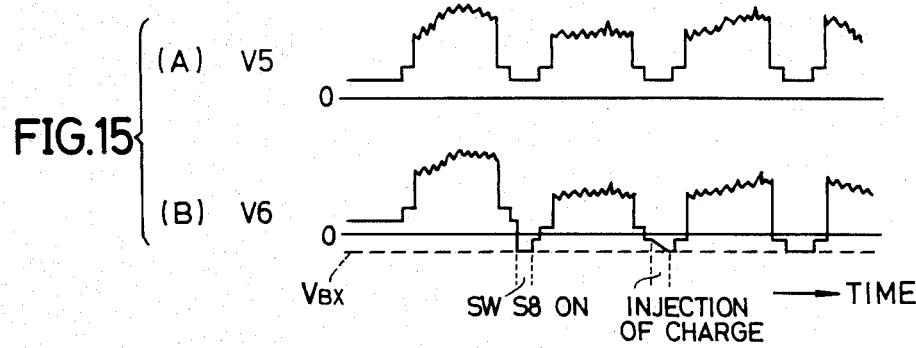
FIG.15 (A) V5
(B) V6
V_BX    SW S8 ON   INJECTION OF CHARGE   →TIME
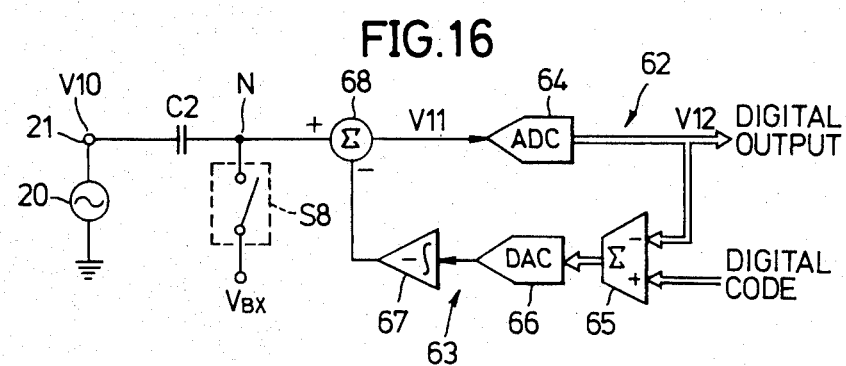
FIG.16
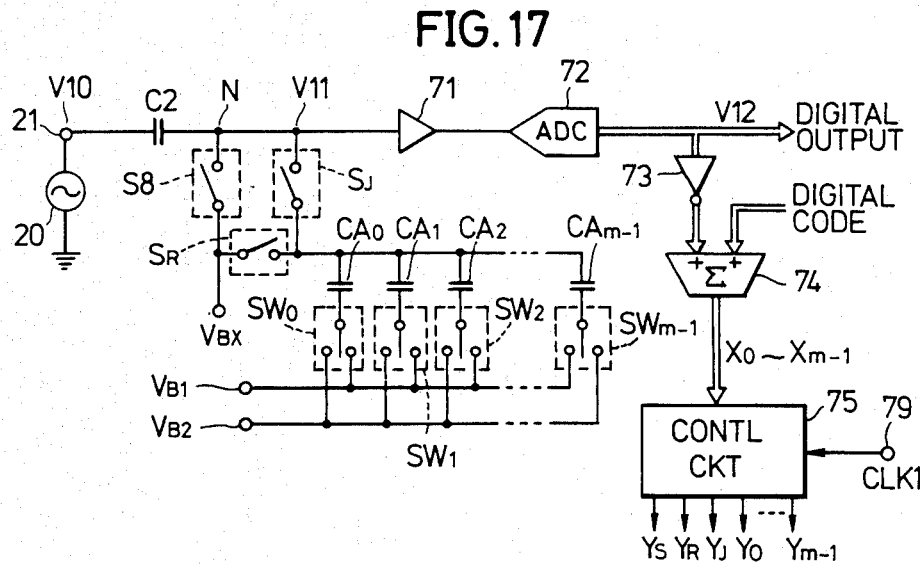
FIG.17

VOLTAGE LEVEL SETTING CIRCUIT

BACKGROUND OF THE INVENTION

The present invention generally relates to voltage level setting circuits, and more particularly to a voltage level setting circuit for setting in a signal processing circuit system a voltage level of a reference portion of an input signal which is obtained from a signal source circuit system.

FIG. 1 shows an example of an image signal processing circuit employing the conventional voltage level setting circuit. An image signal from a signal source circuit system (not shown) is applied to a terminal 10 and is supplied to an image signal processing circuit system 11 through a coupling capacitor C1. The image signal processing circuit system 11 comprises an amplifier 12 for amplifying the incoming image signal from the coupling capacitor C1, an analog-to-digital (A/D) converter 13 for converting an output signal of the amplifier 12 into a digital signal, a digital signal processing circuit 14 for subjecting the digital signal from the A/D converter 13 to a signal processing including a luminance correction and the like, and a voltage level setting circuit 15. The amplifier 12, the A/D converter 13 and the digital signal processing circuit 14 constitute a signal processing circuit. An output digital signal of the image signal processing circuit system 11 is supplied to a circuit system (not shown) in a subsequent stage through a terminal 16.

When the voltage level of the image signal is within a voltage level range which can be processed in the image signal processing circuit system 11, there is no need to provide the coupling capacitor C1 nor the voltage level setting circuit 15. However, the voltage level of the image signal generally does not always fall within the voltage level range which can be processed in the image signal processing circuit system 11.

For example, it will be assumed for convenience, sake that the image signal is obtained from a charge coupled device (CCD) of the signal source circuit system. In this case, the voltage level of the image signal is 6 V to 7 V, but a reference voltage level of a reference portion of the image signal can be converted by use of the coupling capacitor C1 and the voltage level setting circuit 15. The reference voltage is used as a reference level of the input signal. For this reason, the voltage level of the image signal can be converted so as to fall within the voltage level range which can be processed in the image signal processing circuit system 11, such as to a voltage level range of 2 V to 4 V, for example.

FIG. 2 is a circuit diagram for explaining the operation of a first example of the voltage level setting circuit 15. In FIG. 2, those parts which are the same as those corresponding parts in FIG. 1 are designated by the same reference numerals, and a description thereof will be omitted. The image signal from a signal source 17 such as the CCD is applied to the terminal 10. A voltage level setting circuit 15a comprises a bias resistor R1 and a bias voltage source for supplying a bias voltage $V_B$.

When the image signal from the signal source 17 has a voltage level V1 as shown in FIG. 3(A) made up of a D.C. component indicated by a phantom line and an A.C. component, this image signal has a voltage level V2 shown in FIG. 3(B) after it passes through the coupling capacitor C1. In other words, it is possible to set a reference voltage level of the image signal (V2) to the bias voltage $V_B$.

However, according to the voltage level setting circuit 15a, a signal component having a frequency lower than a frequency determined by the coupling capacitor C1 and the bias resistor R1 becomes attenuated. For example, a D.C. step shown in FIG. 3(A) becomes attenuated exponentially (by $e^{-t/C1R1}$, where t denotes the time) as indicated by a phantom line in FIG. 3(B). For this reason, there is a problem in that an appropriate signal transmission cannot be carried out for the D.C. signal component and the low-frequency signal component having a time constant greater than the time constant determined by the coupling capacitor C1 and the resistor R1.

FIG. 4 is a circuit diagram for explaining the operation of a second example of the voltage level setting circuit 15. In FIG. 4, those parts which are the same as those corresponding parts in FIG. 2 are designated by the same reference numerals, and a description thereof will be omitted. A voltage level setting circuit 15b comprises a switching circuit S1 and a bias voltage source for supplying the bias voltage $V_b$.

The image signal from the signal source 17 has a voltage level V3 as shown in FIG. 5(A), for example, and the switching circuit S1 is turned ON while the image signal (V3) has a reference voltage level a during the predetermined time period. Hence, this image signal has a voltage level V4 shown in FIG. 5(B) after it passes through the coupling capacitor C1 and the reference voltage level is clamped to the bias voltage $V_B$. On the other hand, the switching circuit S1 is turned OFF while a picture information portion b of the image signal (V3) is received at the terminal 10, and a D.C. voltage part of the picture information portion b is clamped.

The voltage level setting circuit 15b forcibly sets the voltage level of the image signal to the bias voltage $V_B$ during the predetermined time period corresponding to the reference portion of the image signal. Since this forced setting of the voltage level must be carried out instantaneously, there is a need to carry out a charge and discharge operation at a high speed. Hence, the switching circuit S1 is generally constituted by a semiconductor element such as metal oxide semiconductor (MOS) element and a bipolar element through which a relatively large current may flow. But when the semiconductor element is used to constitute the switching circuit S1, a clock signal feedthrough occurs thereby generating an offset voltage $\Delta V$ shown in FIG. 5(B). This clock signal feedthrough occurs because a charge is generated at a channel of the MOS element (transistor) when the MOS element is turned ON and this charge affects the voltages V4 and $V_B$ when the MOS element is turned OFF. Furthermore, it is difficult to maintain the bias voltage $V_B$ stable when the relatively large current flows through the switching circuit S1. Therefore, there is a problem in that an appropriate signal transmission cannot be carried out.

SUMMARY OF THE INVENTION

Accordingly, it is a general object of the present invention to provide a novel and useful voltage level setting circuit in which the problems described heretofore are eliminated.

Another and more specific object of the present invention is to provide a voltage level setting circuit for setting a D.C. voltage level of a predetermined portion of an input signal which is received by a signal processing circuit system from a signal source circuit system through a coupling capacitor, by controlling a quantity of charge which is injected at a node between the coupling capacitor and the signal processing circuit system. According to the voltage level setting circuit of the present invention, it is possible to accurately set the D.C. voltage level of the predetermined portion of the input signal at the node between the coupling capacitor and the signal processing circuit system, thereby ensuring an appropriate signal processing in the signal processing circuit system.

Still another object of the present invention is to provide a voltage level setting circuit in which a voltage level of a predetermined portion of an input signal is set, that is, a clamping voltage is set, by use of an output digital signal of a signal processing circuit. The value of the output digital signal of the signal processing circuit is compared with a digital code which corresponds to a reference voltage level, and a digital error signal obtained by the comparison is converted into an analog voltage. This analog voltage is added to or subtracted from the input signal during a predetermined time period corresponding to the predetermined portion of the input signal. The clamping voltage is corrected until the digital error signal becomes zero. Therefore, a feedback loop includes an analog-to-digital converter of the signal processing circuit, and it is possible to eliminate an offset voltage generated in the signal processing circuit. Furthermore, since the comparison is made between digital quantities, it is possible to compress an offset voltage generated in the comparing part.

Other objects and further features of the present invention will be apparent from the following detailed description when read in conjunction with the accompanying drawings.

BRIEF DESCRIPTION OF THE DRAWINGS

FIGS. 15 (A and B) shows signal waveforms for explaining the third embodiment of the voltage level setting circuit;

FIG. 16 is a system block diagram showing a signal processing circuit system employing a fourth embodiment of the voltage level setting circuit according to the present invention;

FIG. 17 is a circuit diagram showing the circuit construction of the fourth embodiment;

DETAILED DESCRIPTION

Figure 6:
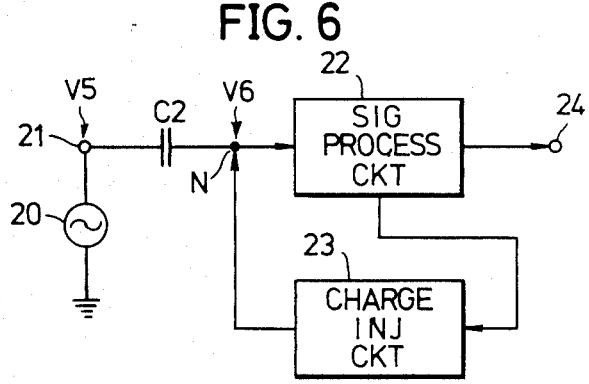
FIG. 6 is a system block diagram snowing a signal processing circuit system employing a first embodiment of the voltage level setting circuit according to the present invention.

FIG. 6 shows a signal processing circuit system employing a first embodiment of the voltage level setting circuit according to the present invention. An input signal such as an image signal received from a signal source 20 of a signal source circuit system is applied to a terminal 21, and is supplied to a signal processing circuit system through a coupling capacitor C2. The signal processing circuit system comprises a signal processing circuit 22 and a charge injecting circuit 23 which is used as an essential part of the voltage level setting circuit. An output signal of the signal processing circuit 22 is supplied to a circuit system (not shown) in a subsequent stage through a terminal 24.

Figure 7:
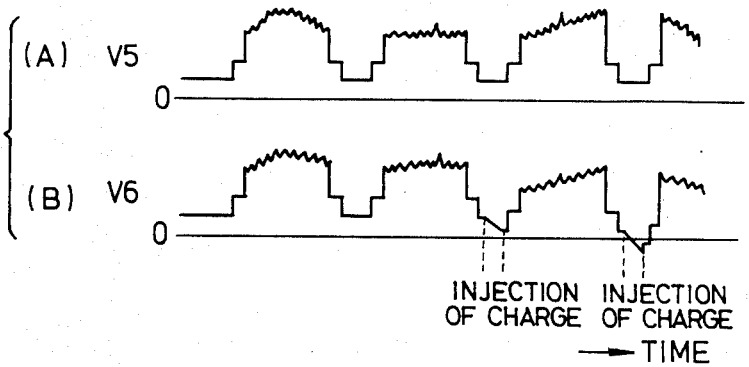
FIGS. 7 (A and B) shows signal waveforms for explaining the first embodiment of the voltage level setting circuit.

A voltage level at a node N between the coupling capacitor C2 and the signal processing circuit system is determined by a quantity of charge injected by the charge injecting circuit 23. The input signal from the signal source 20 has a voltage level V5 shown in FIG. 7(A) at the terminal 21 and has a voltage level V6 shown in FIG. 7(B) at the node N.

According to the present embodiment, the charge injecting circuit 23 injects the charge only during a predetermined time period corresponding to the reference portion of the input signal (V5), and electrically disconnects the charge injecting circuit 23 from the reception side of the signal processing circuit system during other time periods so as to block a D.C. current path and hold the injected charge. As a result, the input signal (V5) can be received by the signal processing circuit system as a signal (V6) which has the reference portion thereof accurately clamped to a predetermined voltage. Since the voltage level of the reference portion is set by the injection of the charge, no offset voltage occurs due to the clock signal feedthrough as in the case of the conventional voltage level setting circuit. For example, in the case where the input signal (V5) from the signal source 20 is an image signal, the image signal is clamped to the predetermined voltage during a synchronizing signal period thereof.

Figure 8:
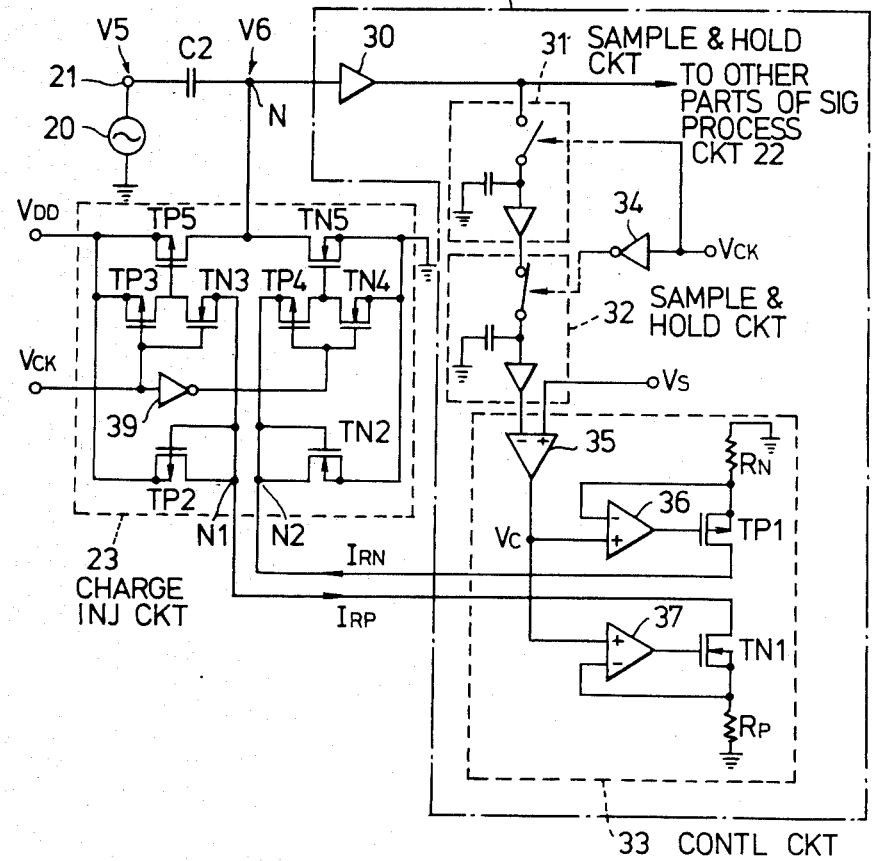
FIG. 8 is a circuit diagram showing the circuit construction of an essential part of the first embodiment.

Next, a description will be given on the circuit construction and operation of an essential part of the first embodiment, by referring to FIG. 8. An essential part of the signal processing circuit 22 related to the charge injecting circuit 23 comprises a buffer 30, sample and hold circuits 31 and 32, a control circuit 33 and an inverter 34. The sample and hold circuits 31 and 32 have the same construction and each comprise a switch, a capacitor and a buffer. The control circuit 33 comprises a differential amplifier 35, operational amplifiers 36 and 37, resistors $R_N$ and $R_P$, a p-channel MOS field effect transistor (FET) TP1 and an n-channel MOSFET TN1. On the other hand, the charge injecting circuit 23 comprises p-channel MOSFETs TP2 through TP5, n-channel MOSFETs TN2 through TN5, and an inverter 39. In FIG. 8, $V_{DD}$ denotes a power source voltage, $V_{CK}$ denotes a clock signal, and $V_S$ denotes a reference voltage to which the input signal (V5) is clamped during the predetermined time period thereof.

Figure 9:
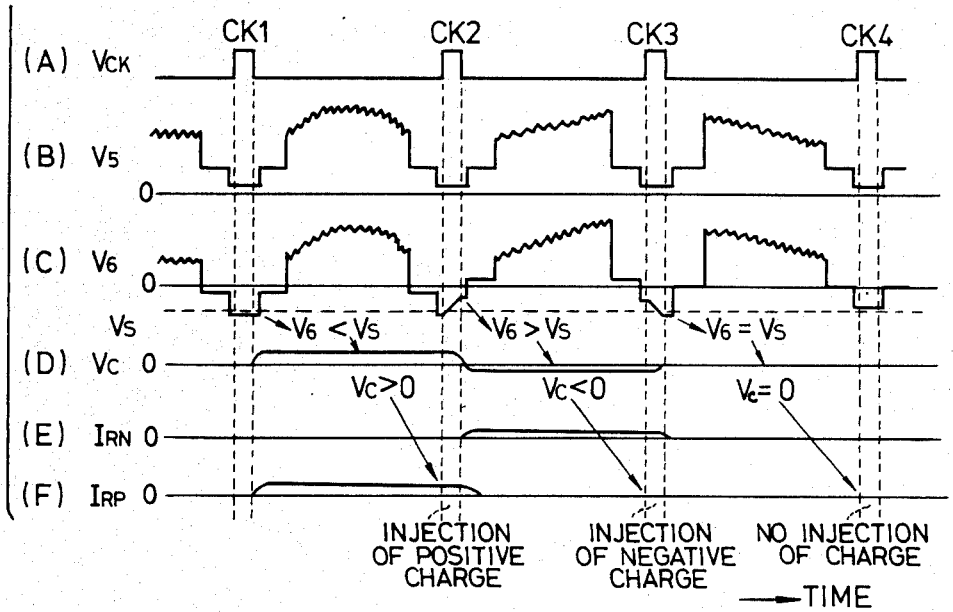
FIGS. 9 (A and B) shows signal waveforms for explaining the operation of the circuit shown in FIG. 8.

The input signal (V5) from the signal source 20 shown in FIG. 9(B) is passed through the coupling capacitor C2 and is converted into a signal (V6) shown in FIG. 9(C) which is amplified in the buffer 30. An output signal of the buffer 30 is passed through the sample and hold circuits 31 and 32, and the signal (V6) during the predetermined time period is supplied to an inverting input terminal of the differential amplifier 35 of the control circuit 33. The output signal of the buffer 30 is also supplied to other parts (not shown) of the signal processing circuit 22. The sample and hold circuit 31 samples the signal (V6) during a high-level period of the clock signal $V_{CK}$ shown in FIG. 9(A), while the sample and hold circuit 32 holds the sampled signal during the high-level period of the clock signal $V_{CK}$. Hence, a voltage which is sampled during the high-level period (for example, CK1) of the clock signal $V_{CK}$ is supplied to the inverting input terminal of the differential amplifier 35 from a time when the level of the clock signal $V_{CK}$ falls to a low level.

The differential amplifier 35 is also supplied with the voltage $V_S$ to a non-inverting input terminal thereof, and compares the sampled voltage from the sample and hold circuit 32 with the reference voltage $V_S$. A voltage $V_C$ shown in FIG. 9(D) which is dependent on a difference between the two compared voltages is outputted from the differential amplifier 35. This voltage $V_C$ is supplied to first and second voltage-to-current converting circuits, where the first voltage-to-current converting circuit comprises the operational amplifier 36, the p-channel MOSFET TP1 and the resistor $R_N$ and the second voltage-to-current converting circuit comprises the operational amplifier 37, the n-channel transistor TN1 and the resistor $R_P$. The first voltage-to-current converting circuit converts the voltage $V_C$ into a current $I_{RN}$ shown in FIG. 9(E) while the second voltage-to-current converting circuit converts the voltage $V_C$ into a current $I_{RP}$ shown in FIG. 9(F).

One of the currents $I_{RP}$ and $I_{RN}$ flows depending on whether the voltage V6 during the predetermined time period is greater than or less than the reference voltage $V_S$. When the reference voltage $V_S$ is greater than the voltage V6 during the predetermined time period and the voltage $V_C$ is greater than zero, it is necessary to raise the voltage level of the voltage V6 at the node N. In this case, the operational amplifier 37 and the n-channel MOSFET TN1 cooperate so that the two inputs of the operational amplifier 37 become the same, and a current $V_C/R_P$ flows through the resistor $R_P$. On the other hand, when the reference voltage $V_S$ is less than the voltage V6 during the predetermined time period and the voltage $V_C$ is less than zero, it is necessary to lower the voltage level of the voltage V6 at the node N. Thus, in this case, the operational amplifier 36 and the p-channel MOSFET TP1 cooperate so that the two inputs of the operational amplifier 36 become the same, and a current $-V_C/R_N$ flows through the resistor $R_N$. Therefore, the current $I_{RN}$ is $-V_C/R_N$ when the voltage $V_C$ is less than or equal to zero, and is zero when the voltage $V_C$ is greater than zero. The current $I_{RP}$ is $V_C/R_P$ when the voltage $V_C$ is greater than or equal to zero, and is zero when the voltage $V_C$ is less than zero.

The current $I_{RP}$ is applied to the MOSFET TP2 of the charge injecting circuit 23 to generate a voltage drop at the MOSFET TP2. The voltage drop generated at the MOSFET TP2 is applied to a gate of the MOSFET TP5 during a time period in which the MOSFET TN3 is turned ON responsive to the high-level period of the clock signal $V_{CK}$. The voltage V6 at the node N is raised by a current which flows through this MOSFET TP5. On the other hand, the current $I_{RN}$ is applied to the MOSFET TN2 of the charge injecting circuit 23 to generate a voltage drop at the MOSFET TN2. The voltage drop generated at the MOSFET TN2 is applied to a gate of the MOSFET TN5 during a time period in which the MOSFET TP4 is turned ON responsive to the high-level period of the clock signal $V_{CK}$. The voltage V6 at the node N is lowered by a current which flows through this MOSFET TN5.

The charge injecting circuit 23 has the construction shown in FIG. 8 for the following reasons. That is, the currents $I_{RN}$ and $I_{RP}$ can be controlled by appropriately selecting the circuit constants of the part of the signal processing circuit 22 shown in FIG. 8. The gate voltages of the MOSFETs TP2 and TN2 can thus be controlled. Hence, when identical transistors are used for the MOSFETs TP2 and TP5, the gate voltage of the MOSFET TP2 becomes the gate voltage of the MOSFET TP5 when the MOSFET TN3 is turned ON, and it becomes possible to control the current which flows through the MOSFET TP5. The MOSFETs TP3 and TN3 cooperate so that the positive charge is injected to the node N only during the predetermined time period of the input signal. The positive charge is injected when the MOSFET TN3 is ON and is not injected when the MOSFET TP3 is ON.

Similarly, when identical transistors are used for the MOSFETs TN2 and TN5, the gate voltage of the MOSFET TN2 becomes the gate voltage of the MOSFET TN5 when the MOSFET TP4 is turned ON, and it becomes possible to control the current which flows through the MOSFET TN5. The MOSFETs TP4 and TN4 cooperate so that the negative charge is injected to the node only during the predetermined time period of the input signal. The negative charge is injected when the MOSFET TP4 is ON and is not injected when the MOSFET TN4 is ON.

Figure 10:
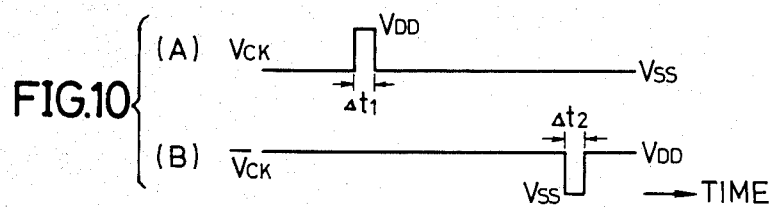
FIGS. 10 (A and B) shows timings of clock signals applied to the circuit shown in FIG. 8.

In FIG. 9(A), the voltage V6 is less than the reference voltage $V_S$ during the high-level period CK1 of the clock signal $V_{CK}$, the voltage V6 is greater than the reference voltage $V_S$ during a high-level period CK2, and the voltage V6 is equal to the reference voltage $V_S$ during a high-level period CK3. Hence, as shown in FIG. 10, the positive charge is injected during the high-level period CK2, the negative charge is injected during the high-level period CK3, and no charge is injected during a high-level period CK4.

The characteristic of the MOSFET TP5 can be described by $I_{DP}=\beta_P(V_{GSP}-V_{thP})^2$, where $\beta_P$ denotes a constant, $I_{DP}$ denotes a drain current of the MOSFET TP5, $V_{GSP}$ denotes a gate-source voltage of the MOSFET TP5, and $V_{thP}$ denotes a threshold voltage of the MOSFET TP5. Similarly, the characteristic of the MOSFET TN5 can be described by $I_{DN}=\beta_N(V_{GSN}-V_{thN})^2$, where $\beta_N$ denotes a constant, $I_{DN}$ denotes a drain current of the MOSFET TN5, $V_{GSN}$ denotes a gate-source voltage of the MOSFET TN5, and $V_{thN}$ denotes a threshold voltage of the MOSFET TN5.

Therefore, the quantity $q_P$ of positive charge which is injected to the node N may be described by the following formula (1), where $V_{A1}$ denotes a voltage at a node N1 applied with the current $I_{RP}$ and $\Delta t1$ denotes a pulse width of the clock signal $V_{CK}$ applied to the MOSFETs TP3 and TN3.

$$q_P = \beta_P(V_{DD}-V_{A1}-V_{thP}) \cdot \Delta t1 \quad (1)$$

The quantity $q_N$ of negative charge which is injected to the node N may be described by the following formula (2), where $V_{A2}$ denotes a voltage at a node N2 applied with the current $I_{RN}$ and $\Delta t2$ denotes a pulse width of the inverted clock signal $\overline{V}_{CK}$ applied to the MOSFETs TP4 and TN4.

$$q_N = \beta_N(V_{DD}-V_{A2}-V_{thN}) \cdot \Delta t2 \quad (2)$$

FIGS. 10(A) and 10(B) show the timings of the clock signal $V_{CK}$ and the inverted clock signal $\overline{V}_{CK}$, respectively.

It may be seen from the formulas (1) and (2) that the quantity $q_P$ of positive charge which is injected to the node N may be controlled by varying $V_{A1}$ and $\Delta t1$, and the quantity $q_N$ of negative charge which is injected to the node N may be controlled by varying $V_{A2}$ and $\Delta t2$. For this reason, the positive or negative charge is injected to the node N during the predetermined time period of the input signal until the predetermined voltage, that is, the reference voltage $V_S$, is reached, and the D.C. voltage level at the node N can be set with a high accuracy.

Figure 11:
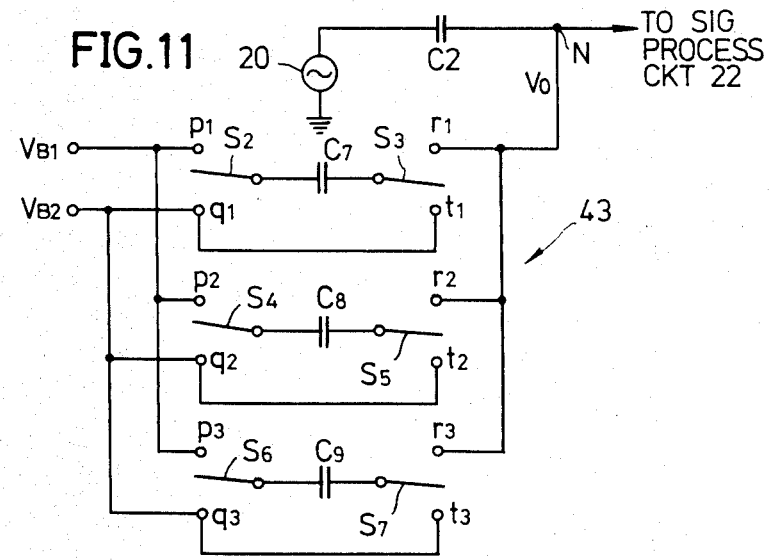
FIG. 11 is a circuit diagram showing an essential part of a signal processing circuit system employing a second embodiment of the voltage level setting circuit according to the present invention.

Next, a description will be given on a second embodiment of the voltage level setting circuit according to the present invention. FIG. 11 shows an essential part of the second embodiment. In FIG. 11, those parts which are the same as those corresponding parts in FIG. 6 are designated by the same reference numerals, and a description thereof will be omitted.

In FIG. 11, a charge injecting circuit 43 comprises switching circuits S2 through S7 and capacitors C7 through C9. $V_{B1}$ and $V_{B2}$ denote mutually different constant voltages, where $V_{B1}>V_{B2}$.

Figure 12:
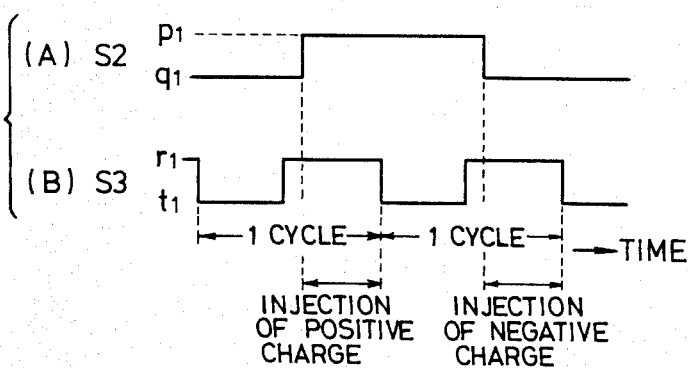
FIGS. 12 (A and B) shows connection timings of switching circuits constituting the second embodiment of the voltage level setting circuit.

A description will be given on the case where the capacitor C7 is charged. In this case, the switching circuit S2 is first connected to a terminal q1 as shown in FIG. 12(A) and the switching circuit S3 is connected to a terminal t1 as shown in FIG. 12(B) so as to initially discharge the capacitor C7. Then, the switching circuit S3 is connected to a terminal r1 as shown in FIG. 12(B) and the switching circuit S2 is thereafter connected to a terminal p1 as shown in FIG. 12(A). Accordingly, a quantity Q1 of positive charge described by the following is injected to the node N, where C7 denotes the capacitance of the capacitor C7 and $V_0$ denotes the output voltage of the charge injecting circuit 43.

$$\begin{aligned} Q1 &= C7 \times (V_{B1}-V_0) \\ &= C7 \times (V_{B1}-V_{B2}) - C7 \times (V_0-V_{B2}) \end{aligned}$$

On the other hand, in the case where the switching circuit S2 is connected to the terminal p1, the switching circuit S3 is then connected to the terminal r1 and the switching circuit S2 is thereafter connected to the terminal q1 as shown in FIGS. 12(A) and 12(B), it is possible to inject a quantity Q2 of negative charge identical to the quantity Q1 of positive charge described before.

$$\begin{aligned} Q2 &= C7 \times (V_{B1}-V_0) \\ &= C7 \times (V_{B2}-V_{B1}) - C7 \times (V_0-V_{B2}) \end{aligned}$$

When $V_{B2}$ is set approximately equal to $V_0$, it is possible to determine the quantity of charge which is injected by the voltages $V_{B1}$ and $V_{B2}$ and the capacitance of the capacitor C7.

In FIG. 11, it is possible to set the capacitances of the three capacitors C7 through C9 so that $C7=2\times C8=2^2\times C9$, where the capacitances of the capacitors are denoted by the same designation of the capacitors. In this case, the switching circuits S2 through S7 can be controlled by a control circuit (not shown) of the signal processing circuit 22, for example, so as to switch and select specific ones of the capacitances C7 through C9, and it is possible to select from fifteen different quantities of charges depending on the selection. That is, seven different quantities of positive charges, seven different quantities of negative charges and one quantity of charge which is injected by nonselection of the capacitances C7 through C9 can be selected.

Accordingly, it is possible to inject the positive or negative charge to the node N during the predetermined time period corresponding to the reference portion of the input signal, and the D.C. voltage level at the node N can be set with a high accuracy. In FIG. 11, only three capacitors C7 through C9 are provided, but it is possible to provide an arbitrary number of capacitors according to the needs.

Figure 13:
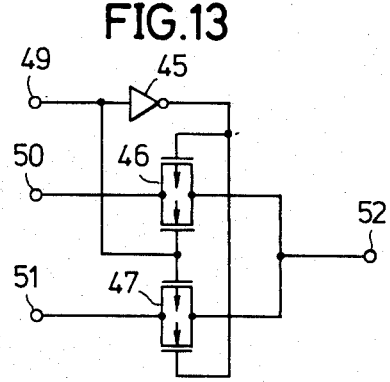
FIG. 13 is a circuit diagram showing an embodiment of the switching circuit used in the second embodiment of the voltage level setting circuit.

FIG. 13 shows an embodiment of the switching circuit which may be used for the switching circuits S2 through S7. The switching circuit has a complementary MOS (CMOS) structure and comprises an inverter 45 and transmission gates 46 and 47 which are connected as shown. A control signal for controlling the switching of the switching circuit is applied to a terminal 49. This control signal may be obtained from the signal processing circuit 22. A signal applied to a terminal 50 is supplied to an arbitrary terminal $p_i$ out of the terminals p1 through p3 or to an arbitrary terminal $r_i$ out of the terminals r1 through r3 in FIG. 11. A signal applied to a terminal 51 is supplied to an arbitrary terminal $q_i$ out of the terminals q1 through q3 or to an arbitrary terminal $t_i$ out of the terminals t1 through t3 in FIG. 11. A terminal 52 is connected to an arbitrary capacitor Ci out of the capacitors C7 through C9 in FIG. 11. The terminal 50 or 51 becomes connected to the terminal 52 responsive to the voltage level of the control signal applied to the terminal 49.

Figure 14:
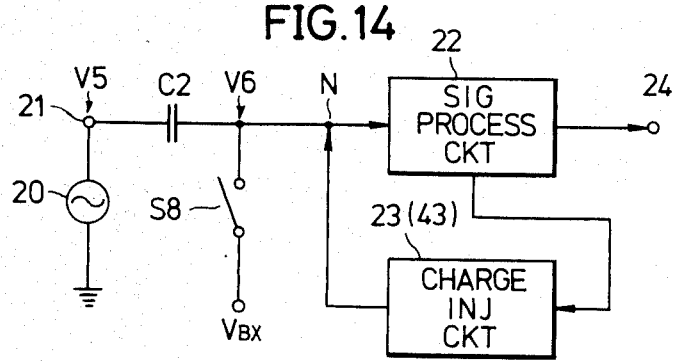
FIG. 14 is a system block diagram showing a signal processing circuit system employing a third embodiment of the voltage level setting circuit according to the present invention.

FIG. 14 shows a signal processing circuit system employing a third embodiment of the voltage level setting circuit according to the present invention. In FIG. 14, those parts which are the same as those corresponding parts in FIG. 6 are designated by the same reference numerals, and a description thereof will be omitted. In the present embodiment, a switching circuit S8 is additionally provided and connected to a bias voltage source for supplying a bias voltage $V_{BX}$. It is possible to use the charge injecting circuit 43 in place of the charge injecting circuit 23.

When a reference portion of the input signal (V5) shown in FIG. 15(A) is obtained at the node N, the switching circuit S8 is turned ON by a control circuit (not shown) so as to supply the bias voltage $V_{BX}$ to the node N. As a result, the voltage (V6) at the node N, that is, the terminal voltage of the coupling capacitor C2, is set to the bias voltage $V_{BX}$ during the predetermined time period of the input signal (V5) as shown in FIG. 15(B), but an offset voltage is included due to the clock signal feedthrough generated when the switching circuit S8 is turned OFF. In other words, the voltage (V6) at the node N during the predetermined time period is slightly different from the bias voltage $V_{BX}$. When the next reference portion of the input signal (V5) is obtained at the node N, the charge injecting circuit 23 injects a quantity of charge to the node N thereby setting the voltage (V6) at the node N to the bias voltage $V_{BX}$.

According to the present embodiment, the injection of charge by the charge injecting circuit 23 can be adjusted quickly and carried out accurately, because the node N is first set to a voltage close to the reference voltage level ($V_{BX}$) by the bias voltage source.

Figure 1:
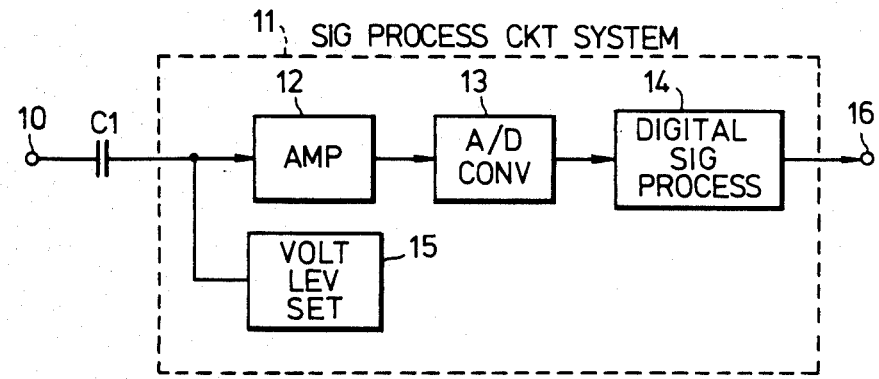
FIG. 1 is a circuit diagram showing an example of an image signal processing circuit employing the conventional voltage level setting circuit.
Figure 2:
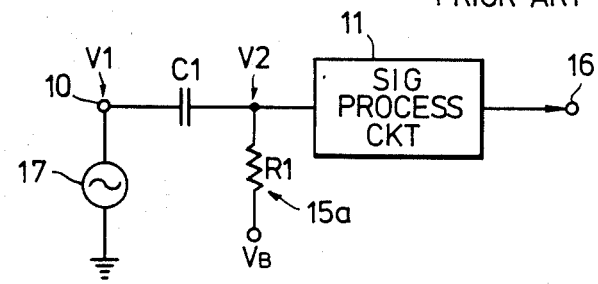
FIG. 2 is a circuit diagram for explaining the operation of a first example of the conventional voltage level setting circuit.
Figure 3:
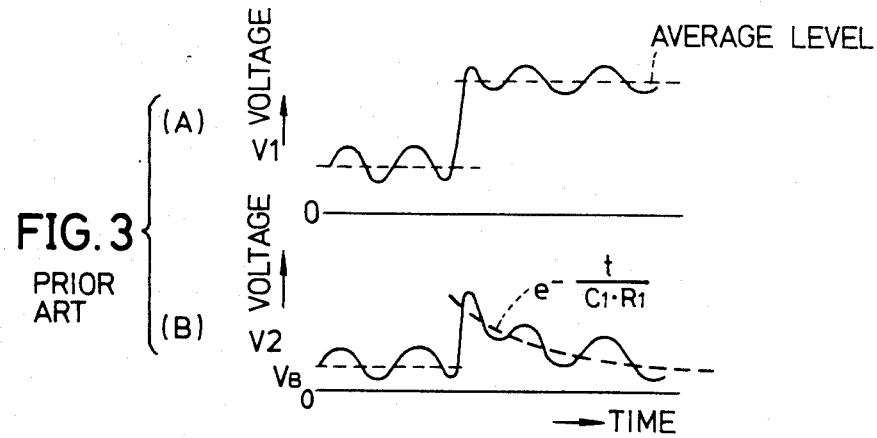
FIGS. 3 (A and B) shows signal waveforms for explaining the first example of the conventional voltage level setting circuit.
Figure 4:
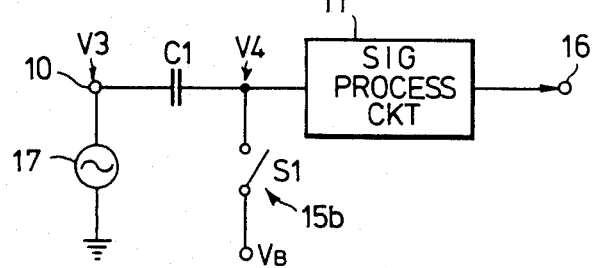
FIG. 4 is a circuit diagram for explaining the operation of a second example of the conventional voltage level setting circuit.
Figure 5:
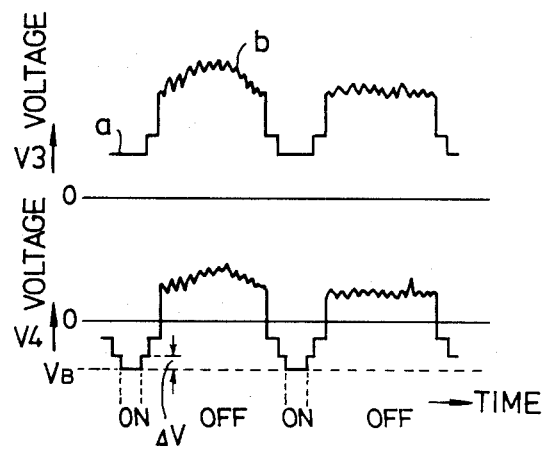
FIGS. 5 (A and B) shows signal waveforms for explaining the second example of the conventional voltage level setting circuit.

According to the first through third embodiments described heretofore, it is possible to set the D.C. voltage level at the node N during the predetermined time period of the input signal with a high accuracy because the embodiments use a feedback from the signal processing circuit 22, while the conventional circuits shown in FIGS. 1, 2 and 4 do not. However, in these embodiments, an A/D converter (not shown) of the signal processing circuit 22 is not included in a feedback loop, and for this reason, it is impossible to eliminate an offset voltage generated from the A/D converter. Hence, a description will be given hereunder on embodiments which can also eliminate the offset voltage generated from the A/D converter of the signal processing circuit.

In the embodiments described hereunder, the voltage level of the reference portion of the input signal is set, that is, the clamping voltage is set, by use of an output digital signal of the signal processing circuit. In other words, the output digital signal of the signal processing circuit is compared with a digital code which corresponds to a reference voltage level, and a digital error signal obtained by the comparison is converted into an analog voltage. This analog voltage is added to or subtracted from the input signal during the predetermined time period of the input signal. The clamping voltage is corrected until the digital error signal becomes zero. Therefore, a feedback loop includes the A/D converter of the signal processing circuit, and it is possible to eliminate the offset voltage generated in the signal processing circuit. Furthermore, since digital signals are compared, it is possible to compress an offset voltage generated in the comparing part.

FIG. 16 shows a signal processing circuit system employing a fourth embodiment of the voltage level setting circuit according to the present invention. In FIG. 16, those parts which are basically the same as those corresponding parts in FIG. 14 are designated by the same reference numerals, and a description thereof will be omitted. In FIG. 16, a signal processing circuit 62 comprises an analog-to-digital (A/D) converter 64, a digital adder 65, a portion of a digital-to-analog (D/A) converter 66 and the like. A charge injecting circuit 63 comprises a remaining portion of the D/A converter 66 and an integrator 67. An analog adder 68 adds the input signal received through the coupling capacitor C2 and an output signal of the charge injecting circuit 63, and supplies an added signal to the signal processing circuit 62.

The digital adder 65 compares a digital output signal of the A/D converter 64 having a voltage level V12 with a digital code corresponding to the reference voltage level, and outputs a digital error signal dependent on a voltage difference between the two compared values. The digital error signal is converted into an analog voltage in the D/A converter 66, and is integrated in the integrator 67. An output signal of the integrator 67 is supplied to the analog adder 68 and is added with the input signal obtained through the coupling capacitor C2. Accordingly, during the predetermined time period of the input signal which has a voltage level V10 at the terminal 21, a voltage level V11 at the node is set to the bias voltage $V_{BX}$ or at least to a voltage close to $V_{BX}$ by the operation of the switching circuit S8, and the voltage during the predetermined time period can be set accurately and quickly to the reference voltage level ($V_{BX}$) by the feedback loop which includes the A/D converter 64 of the signal processing circuit 62.

FIG. 17 shows the circuit construction of the fourth embodiment. The signal processing circuit 62 comprises a buffer 71 for amplifying the voltage level V11 of the input signal at the node N, an A/D converter 72 for converting an output voltage of the buffer 71 into an m-bit digital signal corresponding to the voltage level V12, an inverter 73 for inverting the m-bit digital signal to produce a complementary digital signal, a digital adder 74 for adding the complementary digital signal and an m-bit digital code corresponding to the reference voltage level of the input signal, and a control circuit 75 supplied with bits $X_0$ through $X_{m-1}$ of an output digital error signal of the digital adder 74. The digital error signal indicates a difference between the digital values of the complementary digital signal and the digital code. The control circuit 75 is also supplied with a clock signal CLK1. The control circuit 75 generates various control signals for controlling switching circuits which will be described hereunder.

On the other hand, the charge injecting circuit 63 comprises switching circuits $SW_0$ through $SW_{m-1}$, $S_R$ and $S_J$, and capacitors $CA_0$ through $CA_{m-1}$. The D/A converter 66 shown in FIG. 16 is substantially constituted by the control circuit 75, the switching circuits $SW_0$ through $SW_{m-1}$, $S_R$ and $S_J$, and the capacitors $CA_0$ through $CA_{m-1}$. In FIG. 17, the functions of the integrator 67 and the analog adder shown in FIG. 16 are essentially carried out by the provision of the coupling capacitor C2.

The control circuit 75 generates control signals $Y_S$, $Y_R$, $Y_J$ and $Y_0$ through $Y_{m-1}$ responsive to the clock signal CLK1 and the output digital error signal of the digital adder 74. The control signals $Y_S$, $Y_R$ and $Y_J$ control the ON/OFF state of the switching circuits S8, $S_R$ and $S_J$, respectively. The control signals $Y_0$ through $Y_{m-1}$ control the ON/OFF state of the switching circuits $SW_0$ through $SW_{m-1}$, respectively.

Figure 18:
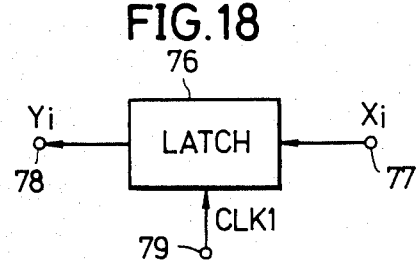
FIG. 18 is block diagram showing an essential part of a control circuit of the circuit shown in FIG. 17.
Figure 19:
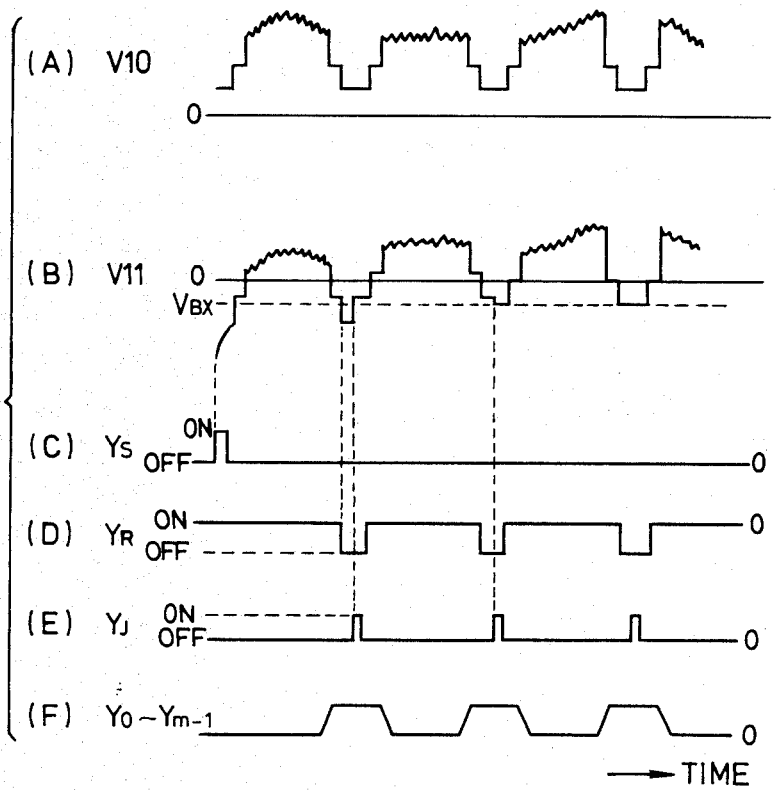
FIGS. 19 (A through F) shows signal waveforms for explaining the operation of the circuit shown in FIG. 17.

FIG. 18 shows an essential part of a control circuit of the circuit 75 shown in FIG. 17. The circuit shown in FIG. 18 generates the control signals $Y_0$ through $Y_{m-1}$ for controlling the switching circuits $SW_0$ through $SW_{m-1}$. A digital signal $X_i$ from the digital adder 74 is applied to a terminal 77, and is latched in a latch circuit 76 with a timing controlled by the clock signal CLK1 from a terminal 79. A latched signal from the latch circuit 76 is outputted through a terminal 78 and is supplied to a corresponding one of the switching circuits $SW_0$ through $SW_{m-1}$ as a control signal $Y_i$. Although not shown, a circuit also generates the control signals $Y_S$, $Y_R$ and $Y_J$ for the switching circuits S8, $S_R$ and $S_J$ in synchronism with the clock signal CLK1.

The capacitors $CA_0$ through $CA_{m-1}$ are used for storing the charge, and a relation $CA_k = 2^k \times CA_0$ stands among the capacitances of the capacitors $CA_0$ through $CA_{m-1}$, where k is greater than or equal to one but less than or equal to m−1 and the capacitances of the capacitors are denoted by the same designation of the capacitors. $V_{B1}$ and $V_{B2}$ denote mutually different reference voltages. Accordingly, when the switching circuit $SW_i$ is switched from the voltage $V_{B1}$ and connected to the voltage $V_{B2}$ in a state where the switching circuit $S_J$ is ON (closed) and the switching circuit $S_R$ is OFF (open), it is possible to inject a quantity $Q_i$ of charge to the node N through the capacitor $CA_i$, where $Q_i = 2^i \times CA_0 \times (V_{B2} - B_{B1})$. The switching of the switching circuit $SW_{m-1}$ of corresponding to a most significant bit (MSB) of the output digital signal of the digital adder 74 is carried out in reverse to the other switching circuits $SW_0$ through $SW_{m-2}$. For example, when the control signal $Y_i$ for controlling the switching circuit $SW_i$ is "1" (high), the switching circuit $SW_i$ is connected to the voltage $V_{B2}$, but the switching circuit $SW_{m-1}$ is connected to the voltage $V_{B1}$. The switching of the switching circuit $SW_{m-1}$ is reversed because the MSB is described by a complementary number for calculation's sake.

The switching circuit having the CMOS structure shown in FIG. 13 described before may be used for the switching circuits $SW_0$ through $SW_{m-1}$. In this case, the terminals 50 and 51 are respectively connected to the voltages $V_{B1}$ and $V_{B2}$, and the terminal 52 is connected to the capacitor $CA_i$. When the control signal $Y_i$ applied to the terminal 49 is "1", the terminal of the capacitor $CA_i$ becomes connected to the voltage $V_{B2}$. On the other hand, the terminal of the capacitor $CA_i$ becomes connected to the voltage $V_{B1}$ when the control signal $Y_i$ applied to the terminal 49 is "0" (low).

As in the case of the third embodiment described before, the switching circuit S8 in FIG. 17 causes the reference portion of the input signal at the node N to be clamped to the bias voltage $V_{BX}$ during the predetermined time period of the input signal. The switching circuit $S_R$ is used to appropriately set the terminal voltage of the capacitor $CA_i$ to the bias voltage $V_{BX}$, and it is possible to thereby accurately inject a quantity of charge to the node N through the capacitor $CA_i$. For example, the bias voltage $V_{BX}$ is set equal to the voltage $V_{B1}$. In this case, the switching circuit $S_R$ is first turned ON to set the terminal voltage of the capacitor $CA_i$ to the bias voltage $V_{BX}$, and the switching circuit $SW_i$ is then switched over and connected to the voltage $V_{B1}$. Hence, the charge stored in the capacitor $CA_i$ becomes zero and assumes a reset state. Next, when the switching circuit S8 is turned ON to disconnect the terminal of the capacitor $CA_i$ from the bias voltage $V_{BX}$ and the switching circuit $SW_i$ is thereafter switched over and connected to the voltage $V_{B2}$, a quantity $Q_i$ of charge is injected to the node N, where $Q_i = CA_i \times (V_{B2} - V_{B1})$. The charge injected by the capacitor $CA_{m-1}$ is $CA_{m-1} \times (V_{B1} - V_{B2})$.

The switching circuit $S_J$ is used to appropriately connect the terminal of the capacitor $CA_i$ to the coupling capacitor C2, that is, the node N. Thus, the quantity $Q_i$ of charge stored in the capacitor $CA_i$ is injected to the terminal of the coupling capacitor C2, that is, to the node N. Therefore, the voltage change at the node due to the injection of the charge is $CA_i/C2 \times (V_{B2} - V_{B1})$ or $CA_{m-1}/C2 \times (V_{B1} - V_{B2})$.

Next, a description will be given on the operation of the circuit shown in FIG. 17 by referring to FIGS. 19(A) through 19(F). When the reference portion of the input signal (V10) is received at the terminal 21, the control circuit 75 outputs the control signal $Y_S$ to turn the switching circuit S8 ON. In this state, the switching circuit $S_R$ is ON responsive to the control signal $Y_R$ and the switching circuit $S_J$ is OFF responsive to the control signal $Y_J$. As a result, the reference portion of the input signal (V11) is clamped to a voltage extremely close to the bias voltage $V_{BX}$.

Then, the signals $X_0$ through $X_{m-1}$ indicative of the voltage difference between the next reference portion of the input signal (V10) and the reference voltage level are outputted from the digital adder 74. The control circuit 75 generates the control signals $Y_S$, $Y_R$, $Y_J$ and $Y_0$ through $Y_{m-1}$ based on the signals $X_0$ through $X_{m-1}$ and the clock signal CLK1. Hence, the switching circuit $S_R$ is first turned ON responsive to the control signal $Y_R$, and the connecting terminals of the switching circuits $SW_0$ through $SW_{m-1}$ are thereafter changed depending on the control signals $Y_0$ through $Y_{m-1}$. Consequently, the quantity $Q_i$ of charge is injected through the capacitor $CA_i$, and the total charge is stored at one terminal of the capacitor $CA_i$. Next, the control signal $Y_J$ controls the switching circuit $S_J$ so that the charge is injected to the coupling capacitor C2, that is, to the node N. For this reason, the reference portion of the input signal (V11) changes and is clamped to the reference voltage level (predetermined voltage).

When receiving the portion other than the reference portion of the input signal (V10), that is, the picture information portion, the switching circuits S8 and $S_J$ are turned OFF. As a result, the input signal is converted into an appropriate signal in which the reference portion is appropriately clamped to the reference voltage level.

The circuit construction of charge injecting circuit 63 is of course not limited to that shown in FIG. 17, and for example, it is possible to use the charge injecting circuits employed in the first through third embodiments described before.

The concept of setting the reference voltage of the input signal, that is, setting the clamping voltage, by use of an output digital signal of the signal processing circuit can also be applied to a case where no capacitive coupling is provided between the signal source circuit system and the signal processing circuit system. A description will now be given on a fifth embodiment of the voltage level setting circuit according to the present invention in which no capacitive coupling is provided between the signal source circuit system and the signal processing circuit system, by referring to FIG. 20.

Figure 20:
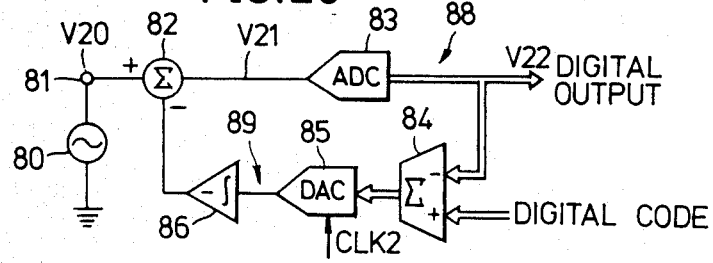
FIG. 20 is a system block diagram showing a signal processing circuit system employing a fifth embodiment of the voltage level setting circuit according to the present invention.

In FIG. 20, an input signal such as an image signal is obtained from a signal source 80 of the signal source circuit system and is applied to a terminal 81 as a voltage V20. The input signal (V20) is supplied to an analog adder 82, and an output signal (V21) of the analog adder 82 is supplied to an A/D converter 83. An output digital signal (V22) of the A/D converter 83 is supplied to a digital adder 84 which is also supplied with a digital code corresponding to a reference voltage level. The digital adder 84 outputs a digital error voltage dependent on a voltage difference between the two compared voltages, and this digital error voltage is converted into an analog error voltage responsive to a clock signal CLK2 in a D/A converter 85. The analog voltage from the D/A converter 85 is integrated in an integrator 86 and is supplied to the analog adder 82. The A/D converter 83 and the digital comparator 84 constitute an essential part of a signal processing circuit 88 related to the voltage level setting circuit. On the other hand, the D/A converter 85, the integrator 86 and the analog adder 82 constitute an essential part of a voltage level setting circuit 89.

Figure 21:
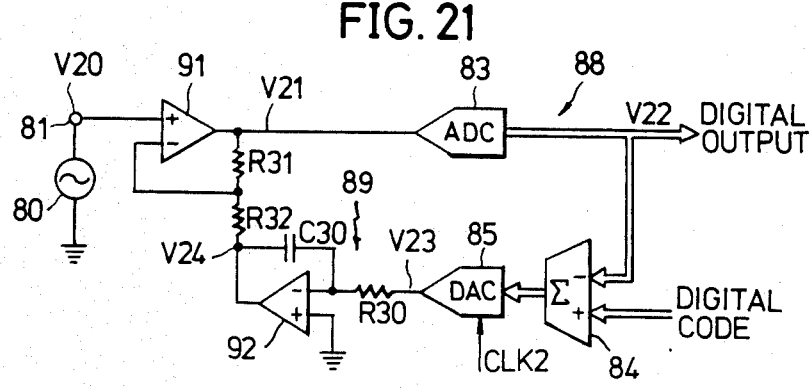
FIG. 21 is a circuit diagram showing the circuit construction of the fifth embodiment.

FIG. 21 shows the circuit construction of the fifth embodiment shown in FIG. 20. In FIG. 21, those parts which are the same as those corresponding parts in FIG. 20 are designated by the same reference numerals, and a description thereof will be omitted. In FIG. 21, the analog adder 82 and the integrator 86 are constituted by operational amplifiers 91 and 92, a capacitor C30 and resistors R30 through R32.

Figure 22:
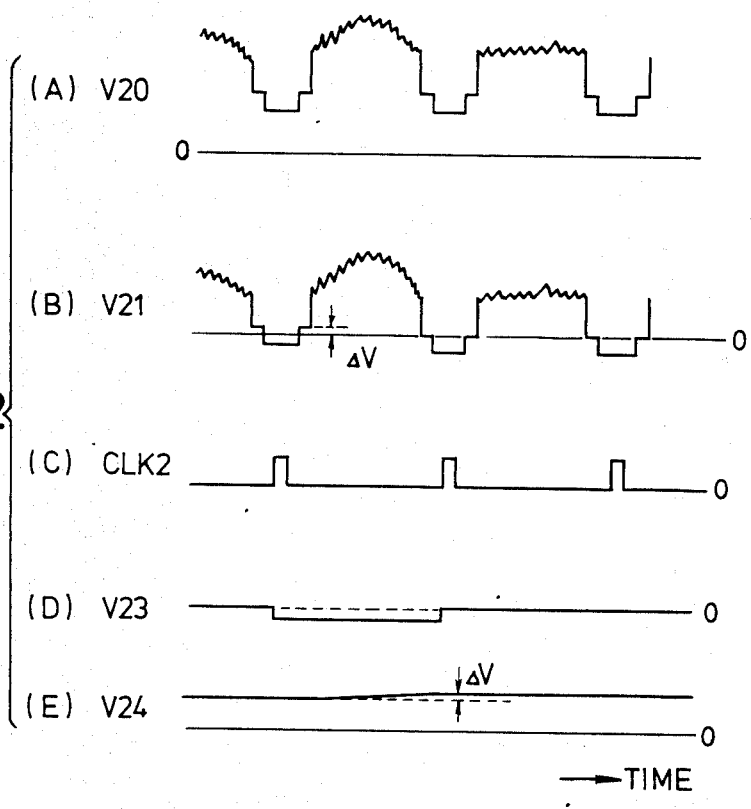
FIGS. 22 (A through F) shows signal waveforms for explaining the operation of the circuit shown in FIG. 21.

Next, a description will be given on the operation of the circuit shown in FIG. 21 by referring to FIGS. 22(A) through 22(E). FIGS. 22(A) and 22(B) show the voltage levels of the output signal (V21) of the operational amplifier 91 and the output digital signal (V22) of the A/D converter 83, respectively. In FIG. 22(B), ΔV denotes the offset voltage. FIG. 22(C) shows the clock signal CLK2 supplied to the D/A converter 85. FIGS. 22(D) and 22(E) show the analog error voltage (V23) outputted from the D/A converter 85 and an output voltage (V24) of the operational amplifier 92, respectively. This output voltage (V24) of the operational amplifier 92 is an integrated voltage of the analog error voltage (V23).

First, the input signal (V20) is applied to a non-inverting input terminal of the operational amplifier 91 and is outputted therefrom as the signal (V21). This signal (V21) is converted into the digital signal (V22) in the A/D converter 83), and the digital signal (V22) is compared with the digital code corresponding to the reference voltage level in the digital adder 84. When a voltage difference exists between the two compared voltages, the digital error voltage indicative of the voltage difference is outputted from the digital adder 84. The digital error voltage is converted into the analog error voltage in the D/A converter 85 with a timing determined by the clock signal CLK2, so that the D/A converter 85 outputs the analog error voltage (V23) only during the predetermined time period corresponding to the reference portion of the input signal (V20). As a result, the D/A converter 85 outputs the analog error voltage (V23) indicative of the voltage difference between the input signal (V21) and the reference voltage level during the predetermined time period of the input signal (V20). The analog error voltage (V23) is integrated into the voltage (V24) in the operational amplifier 92, and the voltage (V24) is applied to an inverting input terminal of the operational amplifier 91.

Therefore, a feedback is made so that the reference portion of the input signal (V21) is set (clamped) to the reference voltage level with a high accuracy during the predetermined time period of the input signal (V20). For example, in the case where the input signal (V20) is an image signal, the predetermined time period corresponds to the synchronizing signal period of the image signal.

According to the present embodiment, circuit parts in which an offset voltage may be generated are all included in the feedback loop, so as to effectively eliminate the offset voltage. In addition, because the voltage level of the reference portion of the input signal is set by comparing a digital quantity of the input signal and a digital quantity of the reference voltage level, it is possible to eliminate the offset voltage which would be generated from the comparator itself in the case where analog quantities are compared. Accordingly, it is possible to set the clamping voltage with a high accuracy.

Further, the present invention is not limited to these embodiments, but various variations and modifications may be made without departing from the scope of the present invention.

What is claimed is:

1. A voltage level setting circuit for setting a D.C. voltage level of a predetermined portion of an input signal received through a coupling capacitor to a desired reference voltage level suited for a signal processing which is carried out in a signal processing circuit, said voltage level of the predetermined portion being used as a reference level of said input signal, said voltage level setting circuit, comprising:
a charge injecting circuit for injecting a quantity of charge to a node between said coupling capacitor and said signal processing circuit, wherein said node has a bias voltage during a predetermined time period, and wherein said voltage substantially corresponds to the predetermined portion of said input signal; and
control means for controlling the injection of charge by said charge injecting circuit responsive to a signal from said signal processing circuit so that the D.C. voltage level of the predetermined portion at said node is set to said desired reference voltage level.

2. A voltage level setting circuit as claimed in claim 1 in which said control means controls said charge injecting circuit so that said charge injecting circuit is electrically disconnected from said node during a time period corresponding to a portion other than the predetermined portion of said input signal.

3. A voltage level setting circuit as claimed in claim 1 in which said control means comprises a first circuit for comparing a voltage level of the input signal received through said node during a predetermined time period corresponding to said predetermined portion and said desired reference voltage level and for producing an error voltage dependent on a voltage difference between the two compared voltages, and a second circuit for producing a first current responsive to said error voltage when the voltage level of said predetermined portion is less than said desired reference voltage level and said error voltage is greater than zero and for producing a second current responsive to said error voltage when the voltage level of said predetermined portion is greater than said desired reference voltage level and said error voltage is less than zero, said charge injecting circuit injecting a quantity of positive charge to said node to raise the voltage level at said node responsive to said first current and injecting a quantity of negative charge to said node to lower the voltage level at said node responsive to said second current.

4. A voltage level setting circuit as claimed in claim 1 in which said input signal is an image signal, said predetermined portion being a synchronizing signal period of said image signal.

5. A voltage level setting circuit as claimed in claim 1 in which said control means comprises means for obtaining a digital error signal by comparing an output digital signal corresponding to said desired reference voltage level and means for controlling said charge injecting circuit based on said digital error signal.

6. A voltage level setting circuit for setting a D.C. voltage level of a predetermined portion of an input signal received through a coupling capacitor to a desired reference voltage level suited for a signal processing which is carried out in a signal processing circuit, said voltage level of the predetermined portion being used as a reference level of said input signal, said voltage level setting circuit, comprising:
a charge injecting circuit for injecting a quantity of charge to a node between said coupling capacitor and said signal processing circuit;
control means for controlling the injection of charge by said charge injecting circuit responsive to a signal from said signal processing circuit so that the D.C. voltage level of the predetermined portion at said node is set to said desired reference voltage level; and
switching means for connecting said node to a bias voltage during a predetermined time period corresponding to the predetermined portion of said input signal and for disconnecting said node from said bias voltage during a time period corresponding to a portion other than said predetermined portion, said bias voltage being set approximately equal to said desired reference voltage level, wherein said control means comprises a first circuit for comparing a voltage level of the input signal received through said node during a predetermined time period corresponding to said predetermined portion and said desired reference voltage level and for producing an error voltage dependent on a voltage difference between the two compared voltages, and a second circuit for producing a first current responsive to said error voltage when the voltage level of said predetermined portion is less than said desired reference voltage level and said error voltage is greater than zero and for producing a second current responsive to said error voltage when the voltage level of said predetermined portion is greater than said desired reference voltage level and said error voltage is less than zero, wherein said charge injecting circuit injecting a quantity of positive charge to said node to raise the voltage level at said node responsive to said first current and injecting a quantity of negative charge to said node to lower the voltage level at said node responsive to said second current.

7. A voltage level setting circuit as claims in claim 6, wherein said control means is for controlling said charge injecting circuit so that said charge injecting circuit is electrically disconnected from said node during a time period corresponding to a portion other than the predetermined portion of said input signal.

8. A voltage level setting circuit as claimed in claim 6, wherein said input signal is an image signal, and wherein said predetermined portion being a synchronously signal period of said image signal.

9. A voltage level setting circuit for setting a D.C. voltage level of a predetermined portion of an input signal received through a coupling capacitor to a desired reference voltage level suited for a signal processing which is carried out in a signal processing circuit, said voltage level of the predetermined portion being used as a reference level of said input signal, said voltage level setting circuit, comprising:
a charge injecting circuit for injecting a quantity of charge to a node between said coupling capacitor and said signal processing circuit; and
control means for controlling the injection of charge by said charge injecting circuit responsive to a signal from said signal processing circuit so that the D.C. voltage level of the predetermined portion at said node is set to said desired reference voltage level,
wherein said control means comprises a plurality of capacitors, first switching means for selectively connecting each first terminal of said capacitor to at least one of first and second constant voltages, and second switching means for selectively connecting each second terminal of said capacitors to at least one of said node and said second constant voltage, said control means controlling switching of said first and second switching means.

10. A voltage level setting circuit as claimed in claim 9 in which said capacitors have mutually different capacitances such that an arbitrary capacitor $C_i$ has a capacitance $2^{i-1} \times C_{i+1}$, where i is an integer.

11. A voltage level setting circuit as claimed in claim 9 which further comprises switching means for connecting said node to a bias voltage during a predetermined time period corresponding to the predetermined portion of said input signal and for disconnecting said node from said bias voltage during a time period corresponding to a portion other than said predetermined portion, said bias voltage being set approximately equal to said desired reference voltage level.

12. A voltage level setting circuit as claimed in claim 9, wherein said control means is for controlling said charge injecting circuit so that said charge injecting circuit is electrically disconnected from said node during a time period corresponding to a portion other than the predetermined portion of said input signal.

13. A voltage level setting circuit as claimed in claim 9, wherein said input signal is an image signal, wherein said predetermined portion being a synchronizing signal period of said image signal.

14. A voltage level setting circuit for setting a D.C. voltage level of a predetermined portion of an input signal received through a coupling capacitor to a desired reference voltage level suited for a signal processing which is carried out in a signal processing circuit, said voltage level of the predetermined portion being used as a reference level of said input signal, said voltage level setting circuit, comprising:

a charge injecting circuit for injecting a quantity of charge to a node between said coupling capacitor and said signal processing circuit;

control means for controlling the injection of charge by said charge injecting circuit responsive to a signal from said signal processing circuit so that the D.C. voltage level of the predetermined portion at said node is set to said desired reference voltage level; and switching means for connecting said node to a bias voltage during a predetermined time period corresponding to the predetermined portion of said input signal and for disconnecting said node from said bias voltage during a time period corresponding to a portion other than said predetermined portion, said bias voltage being set approximately equal to said desired reference voltage level.

15. A voltage setting circuit as claimed in claim 14, wherein said input signal is an image signal, wherein said predetermined portion being a synchronizing signal period of said image signal.

16. A voltage level setting circuit for setting a voltage level of a predetermined portion of an input signal received from a signal source circuit system to a desired reference voltage level suited for a signal processing which is carried out in a signal processing circuit system, said voltage level of the predetermined portion being used as a reference level of said input signal, said voltage level setting circuit, comprising:

comparing means for comparing a digital signal corresponding to said input voltage from said signal processing circuit system and a digital signal corresponding to said desired reference voltage level and for outputting a digital error voltage dependent on a voltage difference between digital quantities of the two compared digital signals;

digital-to-analog converter means for converting the digital error voltage from said comparing means into an analog error voltage;

circuit means for substantially adding the analog error voltage from said digital-to-analog converter means to said input signal during a predetermined time period corresponding to said predetermined portion of said input signal; and switching means for connecting a node between a coupling capacitor and said signal processing circuit system to a bias voltage during a predetermined time period corresponding to the predetermined portion of said input signal and for disconnecting said node from said bias voltage during a time period corresponding to a portion other than said predetermined portion, said input signal being received from said signal source circuit system through said coupling capacitor, said bias voltage being set approximately equal to said desired reference voltage level.

17. A voltage level setting circuit as claimed in claim 16 in which said circuit means comprises an integrator for integrating said analog error voltage from said digital-to-analog converter means, and an analog adder for substantially adding an output voltage of said integrator to said input voltage.

18. A voltage level setting circuit as claimed in claim 16 in which said input signal is an image signal, said predetermined portion being a synchronizing signal period of said image signal.

19. A voltage level setting circuit for setting a D.C. voltage level of a predetermined portion of an input signal received through a coupling capacitor to a desired reference voltage level suited for a signal processing which is carried out in a signal processing circuit, said voltage level of the predetermined portion being used as a reference level of said input signal, said voltage level setting circuit, comprising:

a charge injecting circuit for injecting a quantity of charge to a node between said coupling capacitor and said signal processing circuit; and control means for controlling the injection of charge by said charge injecting circuit responsive to a signal from said signal processing circuit so that the D.C. voltage level of the predetermined portion at said node is set to said desired reference voltage level, said control means controlling said charge injecting circuit so that said charge injecting circuit is electrically disconnected from said node during a time period corresponding to a portion other than the predetermined portion of said input signal, wherein said charge injecting circuit comprising a positive charge injecting circuit and a negative charge injecting circuit which respectively inject a predetermined quantity of charge regardless of a voltage at said node, and wherein said control means is for selectively connecting said positive charge injecting circuit and said negative charge injecting circuit to said node.

* * * * *

UNITED STATES PATENT AND TRADEMARK OFFICE
CERTIFICATE OF CORRECTION

PATENT NO. : 4,859,871

DATED : August 22, 1989

INVENTOR(S) : KOBAYASHI et al

It is certified that error appears in the above-identified patent and that said Letters Patent is hereby corrected as shown below:

On the cover page, Item [75], "Kunihiko Gotch" should read --Kunihiko Gotoh--.

Signed and Sealed this

Fourteenth Day of August, 1990

Attest:

HARRY F. MANBECK, JR.

*Attesting Officer*      *Commissioner of Patents and Trademarks*